Nov. 30, 1965   W. T. LORENZ   3,220,517
DAMPING DEVICE

Filed Oct. 30, 1963   4 Sheets-Sheet 1

Nov. 30, 1965  W. T. LORENZ  3,220,517
DAMPING DEVICE

Filed Oct. 30, 1963  4 Sheets-Sheet 2

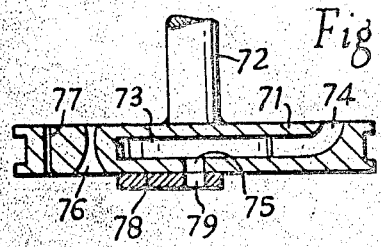
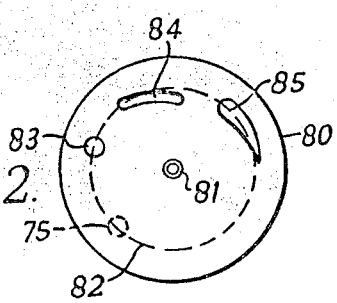
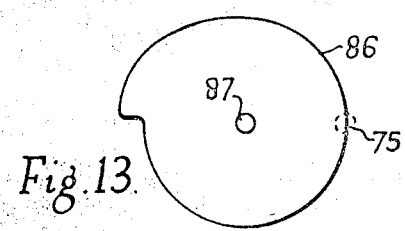
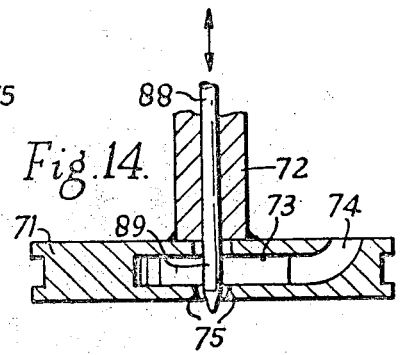
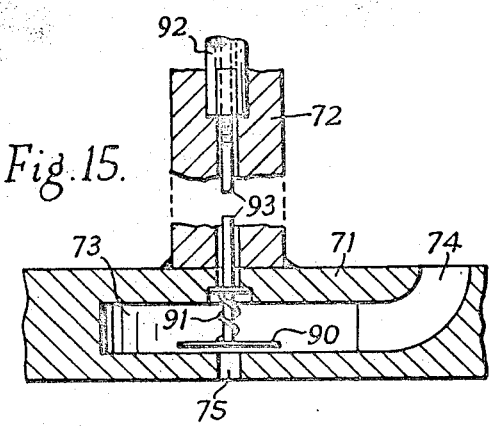

United States Patent Office 3,220,517
Patented Nov. 30, 1965

3,220,517
DAMPING DEVICE
Wilhelm T. Lorenz, Socking, Germany, assignor to R.I.V., Anstalt zur Verwaltung von Real- und Immaterialvermogen, Schaan, Liechtenstein
Filed Oct. 30, 1963, Ser. No. 320,612
Claims priority, application Germany, Oct. 30, 1962, R 33,785; Feb. 1, 1963, R 34,351; Mar. 26, 1963, R 34,792; May 17, 1963, R 35,207
5 Claims. (Cl. 188—97)

The invention relates to a valveless, hydraulic, pneumatic or hydro-pneumatic damping element, especially for shock-absorbers, shock-absorber legs, hydraulic or pneumatic springs and the like.

This damping element can be so formed that it damps in one or both directions of movement, it being possible for the damping to be different for each direction.

If desired in such a damping element there can be installed an adjusting arrangement by which the intensity of the damping can be set before commencement of operation or adjusted during operation.

In the known damping elements the damping is effected by one or more bores arranged in the damping piston, which in order to achieve a varying damping in the two directions of movement are entirely or partially covered with valve spring discs. When a specific pressure of the damping medium is exceeded these discs lift themselves more or less away from the bores and thus clear a larger or smaller throttle cross-section, or they block off a bore completely for the one direction of through-flow.

In order to avoid an irregular distribution of tension in the valve spring discs—caused for example by the rolling or stamping operation in the production or by material fatigue on longer duration of operation—or in order to be able to adjust the desired initial tension at all, appropriate measures must be provided. Accordingly it is necessary to adjust every individual apparatus, for example a shock-absorber, exactly so that it delivers the prescribed characteristics, it being necessary for a specific temperature of the damping medium to be adopted as basis, since the viscosity or intensity of the medium and thus also the damping behaviour are temperature-dependent.

Now the present invention is based upon the problem of providing a damping element which does not possess the indicated drawbacks and furthermore is completely reliable in operation as a result of the absence of all movable parts, and renders possible a relatively cheap production. The stated problem is solved by a damping element which is characterised according to the invention by the following features, taken individually or combined with one another:

(a) A cylindrical flow chamber serving for the rearrangement of the flow lines on reversal of the direction of flow, into which chamber a channel opens tangentially and a central bore opens axially;

(b) Nozzles formed hydro-dynamically or aero-dynamically in a manner known per se, the throttle resistance of which is greater in one direction of passage than in the other;

(c) Combination of (a) and/or (b) with passages whose throttle resistance is the same in both directions of flow.

The damping effect comes about due to the fact that the damping medium is introduced tangentially into the two flow chambers and there forms a more or less strong eddy in dependence upon the speed of flow. Due to this eddy formation the damping medium is forced away from the central bore as a result of the centrifugal force, so that a baffle effect dependent upon the speed of flow occurs, that is to say the damping action increases with increasing piston speed.

Experiments have shown that such damping elements display a largely constant damping behaviour, that is to say that they possess a nearly constant degree of damping both at low and at high temperatures.

If a damping action is desired in both directions, flow chambers can be arranged on both ends of the damping cylinder, which are connected with one another through one or more conduits which open tangentially into the flow chambers and with the damping chamber by central bores in the transverse walls. Naturally in place of the conduits a jacket could be placed around the damping cylinder, in which case the fluid is conducted in the annular space between the cylinder and the jacket.

According to a further form of embodiment of the invention the two eddy chambers can be housed coaxially in the damping piston, these chambers being connected with one another through a central channel and their tangential inlets connecting the end of the damping piston with the flow chamber in each case.

For the influencing of the damping behaviour of the two flow chambers according to a further development of the invention a preferably axially adjustable hollow cylinder is arranged in place of the central connecting channel.

In order to be able to influence the speed of response as well as the damping behaviour of the flow chambers, the axially adjustable insert between the two flow chambers is advantageously so formed that its external diameter represents a multiple of the diameter of its central bore and also its axial length is greater than the thickness of the partition between the two flow chambers. By such an insert a large part of the damping medium is forced out of the centre of the flow chambers, so that the remainder of the medium contained in the flow chamber is situated at a relatively great distance from the centre that is to say is much more strongly influenced by the centrifugal force, and furthermore comes more rapidly into rotation—in the case of tangential inflow—since the mass to be accelerated is less than if the damping medium were to fill the entire flow chamber.

A further possibility of making the damping behaviour of the two flow chambers different from one another consists in making the central connecting channel conical.

In order to achieve a quite particular damping behaviour in the damping element according to the invention the passages and/or nozzles can be entirely or partially covered in a manner known per se by means c adjustable discs or by means of valve spring discs whic lift away due to the pressure of the damping medium.

In order to be able to set the damping behaviour according to the requirements in each case, according to further development of the invention the central bore in the transverse walls of the flow chambers are provide with threadings into which externally threaded hollo cylinders are screwed, with which there are associated stops, the counter-stops of which are arranged in a mai ner known per se on the damping piston. By the adjus ment of these hollow cylinders the damping behavior can be influenced within wide limits, so that inaccuraci in production can be compensated subsequently. Furthe more due to this arrangement it is possible to use or and the same type of shock-absorber for different pu poses with different damping behaviours.

In order to prevent the hollow cylinders from enterir the damping chamber, they are expediently provided their side facing the flow chamber with a collar-like e tension which also forms an additional means for the i fluencing of the degree of damping.

Furthermore between the internal threadings of t central bores and the external threadings of the holle cylinders there is advantageously provided a tough elastic means, preferably in the form of a tube, whi serves to prevent undesired shifting of the hollow cylinders. According to the invention furthermore—according to the requirements made in each case—one of the two transverse walls may be omitted, the connecting conduits issuing tangentially from the flow chamber and opening into the damping chamber on the side opposite to the flow chamber. It can also be advantageous if the connecting conduits are introduced into the damping chamber at different levels.

The flow cross-section of the central bore in the flow chamber can further be varied intermittently or steplessly by an adjusting element.

This adjusting element advantageously consists of a rotatably mounted disc which processes at least one hole which is so arranged on the disc that by the rotation thereof the central bore can be more or less covered. A possibility of finer adjustment is obtained if a plurality of piercings are provided on the rotatably mounted disc, the arrangement of which is made such that they are all intersected by a circle described about the centre of rotation of the disc, the individual piercings possessing different forms, for example fish bladder shape.

A similar adjusting effect can be achieved if the radial defining surface of the rotatably mounted disc is made of spiral form. In this case the spacing of the centre of rotation of the disc from the edge of the central bore should be selected according to the minimum radius of the disc.

A further advantageous possibility of adjustment is obtained if as adjusting element there is used an axially movable pin, the tip of which is made conical and which extends more or less deeply into the central bore according to the axial adjustability, and thus leaves free a more or less large annular gap.

In many cases it proves expedient to render the effect of the adjusting means dependent upon the speed of flow of the flow medium. According to a further development of the invention this is achieved due to the fact that before the central bore there is arranged a covering disc which is so resiliently mounted that its spacing from the central bore, and thus the flow resistance, varies in dependence upon the speed of flow of the through-flowing medium.

In order to render possible satisfactory working of the damping element according to the invention, more especially in order to avoid breaking away of the liquid column, for example of damping oil, on the occurrence of relatively strong pressure surges which change their direction rapidly, and in order to prevent cavitation phenomena which have a very disadvantageous effect, it is necessary that the liquid damping medium shoud be subject to a filling pressure of at least 5 atm. super pressure (70 p.s.i.g.) maintained by a gas cushion, and between the liquid and the gas there is provided a separating element known per se, preferably a floating piston. The separating element here serves for a double purpose, namely, firstly to maintain the predetermined minimum pressure, and secondly to prevent dissolving of the pressure gas in the damping liquid.

Where a gaseous damping medium is used, similar consideration, to the above apply as regards the minimum pressure. Here however the compression ratio must be taken into consideration, which for example in pneumatic springs is defined by the ratio of the cylinder volume with the recuperator fully extended to the cylinder volume with the recuperator fully retracted, there being understood by the recuperator a piston rod, a plunger piston or the like. Now it has appeared that the manner of operation of the damping element according to the invention is most advantageous if in the case of a gaseous damping medium the arithmetic mean of initial pressure (recuperator completely extended) and final pressure (recuperator completely retracted) is greater than 75 atm. super pressure (1000 p.s.i.g.).

The invention is explained in greater detail hereinafter with reference to the purely diagrammatic drawings with the aid of a plurality of examples of use, wherein:

FIGURE 11 shows the arrangement of an adjusting element of disc form before the central bore of a flow chamber;

FIGURES 12 and 13 show forms of embodiment of such adjusting elements;

FIGURE 14 shows an adjusting element in the form of a pin with conical tip;

FIGURE 15 shows an adjusting device influenceable by the speed of flow.

Figure 1:
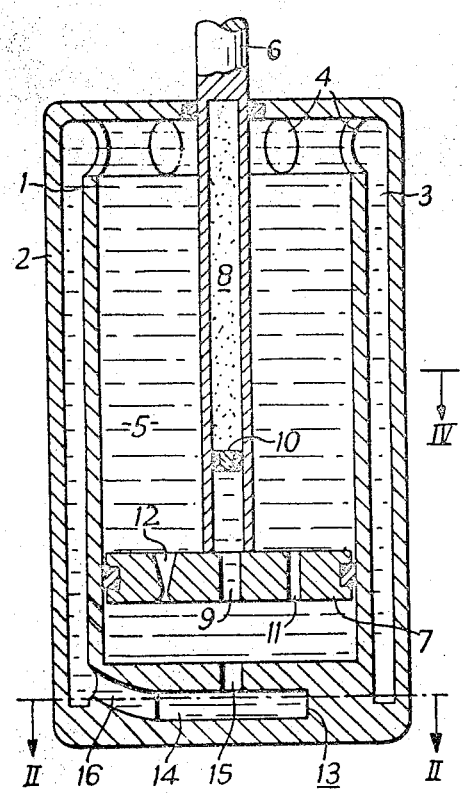
FIGURE 1 shows a hydro-pneumatic shock-absorber wherein the damping element is arranged in the bottom of the damping cylinder.

The damper internal cylinder 1 according to FIGURE 1 is surrounded by a second cylinder 2 at slight spacing, so that an annular space 3 is produced which is connected through bores 4 with the internal space 5 of the damper internal cylinder 1. A piston rod 6 introduced in pressure-tight fashion into this space 5 and carrying the piston 7 is made hollow on its side facing the piston 7, this cavity 8 being connected through a bore 9 in the damping piston 7 with the space 5. While the space 5 and the annular space 3 are filled with damping fluid, in the cavity 8 in the piston rod 6 there is situated compressed gas which is closed off from the damping fluid by a floating piston 10. In the damping piston 7 there are provided passages for the damping fluid which according to the desired degree of damping can be cylindrical bores 11 or nozzles 12 with throttle resistance dependent upon the direction of flow. In the bottom of the shock-absorber there is arranged the damping element 13, the flow chamber 14 of which is connected with the space 5 through the central bore 15, while the channel 16, as may also be seen from FIGURE 2, constitutes the connection to the annular space 3 and opens tangentially into the flow chamber 14.

On driving in of the piston 7 the damping fluid is conducted out of the space 5 through the damping element 13 into the annular space 3 and returned through the bores 4 into the upper part of the space 5. In the case of this direction of flow the damping fluid in the damping element 13 is opposed by a more or less constant throttle resistance, largely independently of the speed of flow.

In contrast thereto, on reversal of the direction of flow, that is to say in the extension of the damping piston 7, the damping fluid is introduced through the channel 16 tangentially into the flow chamber 14 and thence issues through the bore 15 into the chamber 5. In dependence upon the speed of flow an eddy forms in the flow chamber 14, so that the damping fluid is forced as a result of centrifugal force away from the outlet bore 15. The action of the centrifugal force is the greater, the higher is the speed of flow with which the damping fluid flows from the channel 16 into the flow chamber 14. That is to say the quantity of fluid flowing through the bore 15 into the space 5 per unit of time is the smaller, the greater is the inflow pressure in the channel 16. Since now however this pressure in the channel 16 is directly dependent upon the speed of extension of the piston 7, in other words this signifies that the degree of damping of the damping element 13 is a function of the speed of extension of the piston 7 and rises therewith.

The degree of damping of the damping element 13, allocated to the individual speeds of flow, can be adjusted within wide limits by variation of the individual dimensions thereof. Furthermore the damping behaviour of the entire system can be influenced additionally by bores 11 and nozzles 12 possessing a throttle resistance dependent upon the direction of flow, which can be arranged in the damping piston 7.

Figure 3:
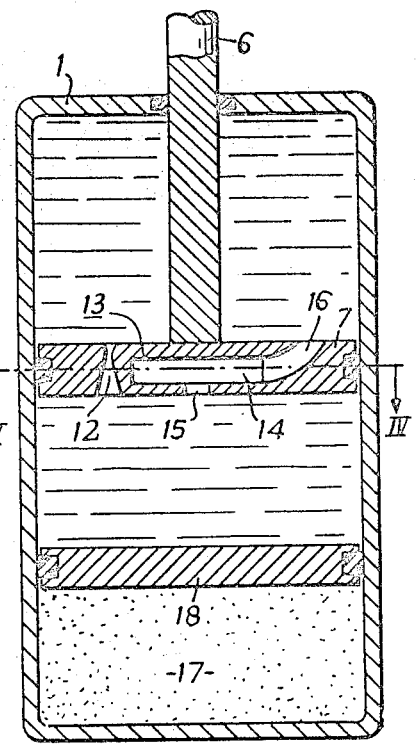
FIGURE 3 shows a hydro-pneumatic shock-absorber wherein the damping element is arranged in the damping piston.
Figure 2:
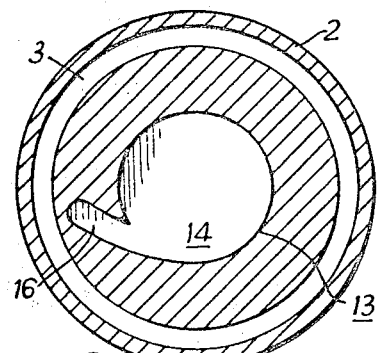
FIGURE 2 shows a cross-section along the line II—II in FIGURE 1.
Figure 4:
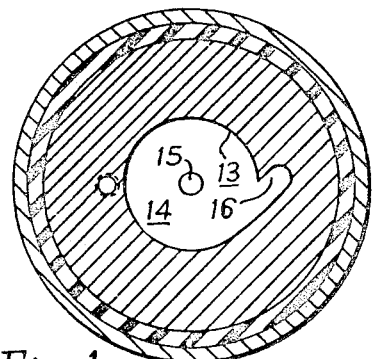
FIGURE 4 shows a section through FIGURE 3 along the line IV—IV.

While in the example of embodiment according to FIGURES 1 and 2 the damping fluid is pumped back and forth by the damping piston 7 through the damping element 13, in the example of embodiment according to FIGURES 3 and 4, the damping element 13 is arranged in the piston 7. In order in this example to render the degree of damping dependent upon the speed of extension of the damping piston 7, the damping element 13 must be so arranged that the channel 16 opening tangentially into the flow chamber 14 opens out of the damping piston 7 in the extending direction and the bore 15 opens out of the damping piston 7 in the retracting direction, so that in the former direction a greater throttle resistance occurs than in the latter.

For the maintenance of the internal pressure there is arranged at the bottom of the damping cylinder 1 a gas cushion 17 which is separated from the damping fluid by a floating piston 18. In this example of embodiment again the degree of damping can be influenced by additional passages in the damping piston 7, with or without throttle resistance dependent upon the direction of flow.

The damping fluid can be replaced—for example in the case of pneumatic springs—by highly compressed gas. In this case obviously it is possible to dispense with the gas cushion 8 or 17 and the floating pistons 10 and 18. The above-described manner of operation remains however the same, although the damping element according to the purpose in each case must be somewhat differently designed, and the nozzles 12 are formed as diffusors, preferably after the style of Laval or Venturi nozzles.

Figure 5:
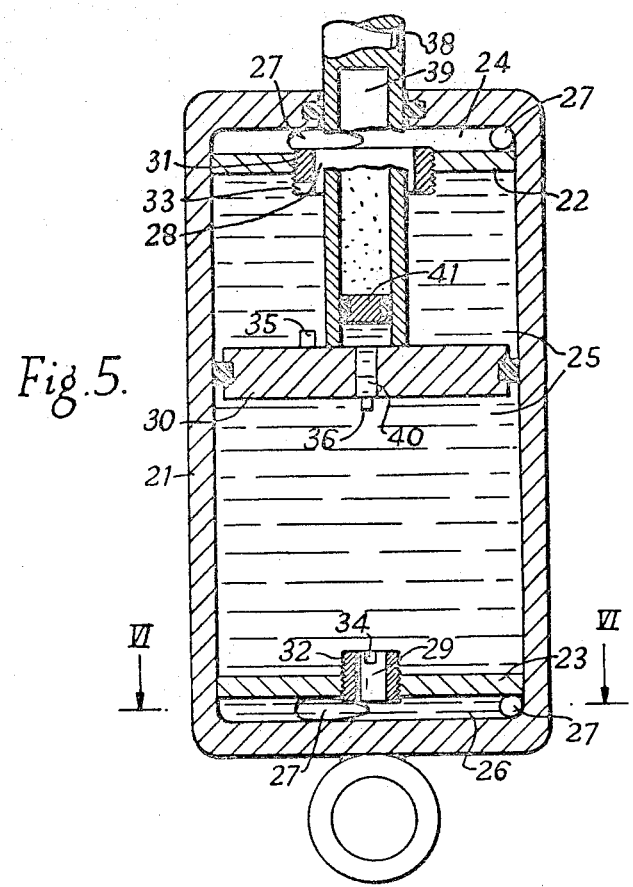
FIGURE 5 shows a longitudinal section through a shock-absorber.
Figure 6:
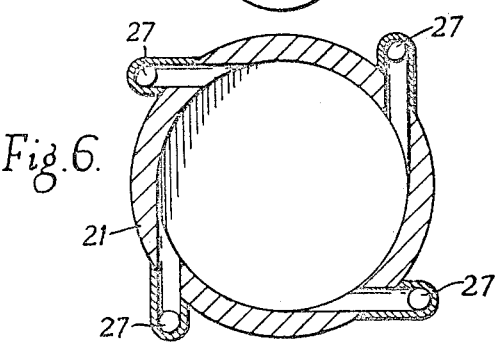
FIGURE 6 shows a cross-section along the line VI—VI in FIGURE 5.

In the case of the form of embodiment according to FIGURES 5 and 6 the damping cylinder 21 possesses on its two ends flow chambers 24 and 26 separated by transverse walls 22 and 23 from the damping space 25, which chambers are connected with one another through conduits 27 which open tangentially into the flow chambers, while the connection between the flow chambers and the damping space 25 is constituted by central bores 28 and 29 in the transverse walls 22 and 23.

The damping space 25 is divided into two spaces by a valveless piston 30 provided with a sealing ring 37. For the compensation of volume there is provided in the piston rod 38 of hollow formation a gas cushion 39, which is charged through the bore 40 in the damping piston 30 with the pressure of the damping medium and is separated therefrom by a floating piston 41. Into the central bores 28 and 29 of the transverse walls 22 and 23 there are screwed hollow cylinders 31 and 32 possessing set stops 33 and 34 on their sides facing the piston 30, while the counter-stops 35 and 36 are arranged on the damping piston 30. By means of these stops 33, 34, 35 and 36 the hollow cylinders 31 and 32 can be screwed more or less deeply into the flow chambers 24 and 26 according to the desired damping behaviour of the shock-absorber.

In place of the connecting conduits 27 as represented in the drawing there can be provided a second hollow cylinder surrounding the annular space. It is further possible to replace the conduits 27 by channels in or directly on the damping cylinder 21.

Figure 7:
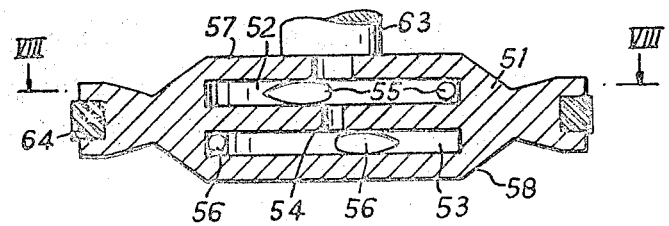
FIGURE 7 shows a damping piston in sectional lateral view.
Figure 8:
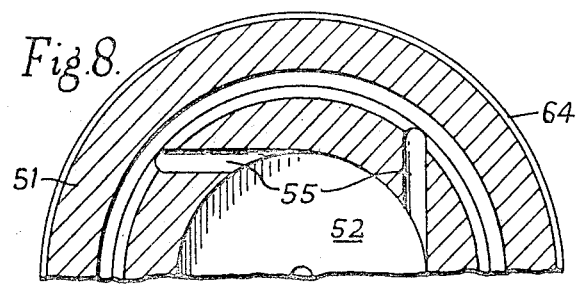
FIGURE 8 shows a section through FIGURE 7 along the line VIII—VIII.

In the damping piston 51 according to FIGURES 7 and 8, which is secured on a piston rod 63 and possesses a sealing ring 64 on its cylindrical defining surface, there are coaxially arranged the flow chambers 52 and 53 which are connected with one another through a central channel 54 and possess tangential inlet channels 55 and 56, which connect the flow chambers 52 and 53 respectively with the end 57 and 58 respectively of the damping piston 51. It is generally sufficient to provide one single tangential channel per flow chamber, but for example for reasons of symmetrical loading of the damping piston it can be expedient to provide a plurality of inlet channels in uniform distribution per flow chamber.

Figure 9:
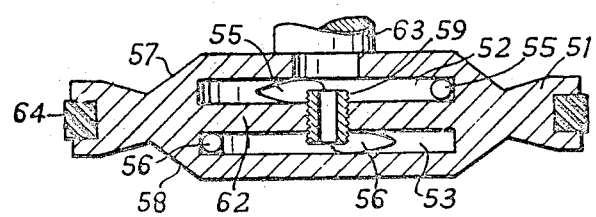
FIGURE 9 shows the sectional lateral view of a damping piston with adjustable hollow cylinder.

In order to be able to influence the damping behaviour of the flow chambers, in the example of embodiment according to FIGURE 9 in place of the central channel 54 there is arranged an axially adjustable hollow cylinder 59, by the adjustment of which the damping effect of the one chamber in comparison with the other and thus the damping effect of the piston in retraction and extension can be made different.

Figure 10:
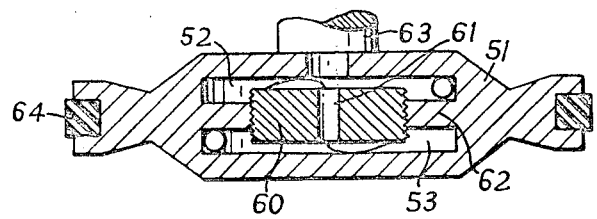
FIGURE 10 shows a damping piston with adjustable cylinder in section.

In place of the hollow cylinder 59 in the example of embodiment according to FIGURE 10 there is provided a cylinder 60 which possesses a central bore 61 for the connection of the two flow chambers 52 and 53 and like the hollow cylinder 59 is made axially adjustable. This adjustment can take place in both cases in a manner known per se, for example by means of a box spanner or another suitable device. The dimensions of the cylinder 60 are advantageously so selected that its external diameter is a multiple of the diameter of the bore 61. The axial length of the cylinder 60 is so selected that it is greater than the thickness of the partition 62 between the two flow chambers 52 and 53.

It is self-evident that in place of the axially adjustable cylinders 59 and 60 there may also be provided non-adjustable cylindrical parts, especially in the case of damper pistons produced in large series, which are set from the outset in all details to a desired particular damping behaviour.

In the example of embodiment according to FIGURE 11 in a shock-absorber piston 71 with the piston rod 72 there is arranged a flow chamber 73 which possesses a tangential channel 74 and an axial central bore 75. Furthermore in the damping piston 71 there are represented a nozzle 76 with throttle resistance dependent upon flow direction, and a bore 77 with throttle resistance which is equal in both directions of passage. Before the central bore 75 there is arranged an adjusting element in the form of a rotatably mounted disc 78 having a piercing 79. By rotation of the disc 78 the piercing 79 can be brought more or less into coincidence with the central bore 75 and thus the passage cross-section can be varied.

FIGURE 12 shows an adjusting element in the form of a repeatedly pierced disc 80, the piercings 83, 84 and 85 of which possess different shapes and are all intersected by a circle 82 described about the centre 81 of rotation of the disc 80. The centre of rotation 81 is more expediently so selected in relation to the axial bore 75 that its distance from the axis thereof is equal to the radius of the circle 82.

The example of embodiment according to FIGURE 13 shows an adjusting element 86 of disc form, the radial defining surface of which has a spiral course. Such an adjusting element is preferably to be so constructed, and its centre of rotation 87 is to be provided at such a distance beside the central bore 75, that its minimum radius just contacts the edge of the bore 75 and its maximum radius entirely covers the bore 75.

In FIGURE 14 there is provided as adjusting means an axially movable pin 88, the conical tip 89 of which extends into the central bore 75 of the flow chamber 73 According to the adjustable depth of penetration of the tip 89 a more or less large annular gap is left free for the passage of the flow medium.

The disc-shaped adjusting element 90 in FIGURE 15 is so arranged before the central bore 75 within the flow chamber 73 that the distance between the element 90 and the bore 75 is varied by the influence of the flow medium against the resistance of the spring 91. The initial tension of the spring 91 and thus the minimum spacing of the disc 90 can be regulated by a set screw 92, which is arranged at the end of the support rod 93 conducted through a bore of the piston rod 72. In the case of this arrangement the adjusting element 90 forms a constant flow resistance for the flow of medium issuing from the flow chamber 73 through the central bore 75. For the medium flowing into the flow chamber 73 through the central bore 75 the resistance caused by the adjusting element 90 varies according to the speed of flow with which the medium strikes thereon, adjusting it against the action of the spring 91.

By the above-described measures it is possible to adapt a standard damping element to the most various purposes with various requirements of the damping behaviour.

I claim:

1. A damping device comprising a piston device, a cylinder device containing fluid and in which the piston device is movably located, means whereby the fluid can pass from one side of the piston to the other, said means including a cylindrical flow chamber provided with a tangential opening and a central bore opening whereby the fluid can flow into either opening and out of the other opening according to the direction of movement of the piston in the cylinder, and an adjustable element mounted adjacent said chamber to vary the rate of fluid flow through said means, said adjustable element being a hollow control cylinder mounted adjustably in the central bore opening so that its depth of entry into the flow chamber can be varied.

2. A damping device as claimed in claim 1 wherein the adjustable hollow cylinder is provided with set stops, while a counter-stop is arranged on the piston.

3. A damping device comprising a piston device, a cylinder device including a damping space containing fluid and in which the piston device is movably located, means whereby the fluid can pass from one side of the piston to the other, said means including two cylindrical flow chambers, said flow chambers being arranged on both ends of the damping cylinder respectively, the flow chambers being connected with one another through at least one conduit which opens tangentially into the flow chambers, and with the damping space by central bores, whereby the fluid can flow into either opening of each flow chamber and out of the other opening thereof according to the direction of movement of the piston in the cylinder, and an adjustable element mounted adjacent each chamber to vary the rate of fluid flow through said means.

4. A damping device as claimed in claim 3 wherein said adjustable damping element is in the form of a hollow control cylinder mounted adjustably in the central bore opening of each chamber so that its depth of entry into the flow chamber can be varied.

5. A damping device as claimed in claim 4, wherein the hollow cylinder has a collar-like extension on one side thereof.

References Cited by the Examiner

UNITED STATES PATENTS 2,541,234    2/1951    Fulton _____ 188—96

FOREIGN PATENTS 29,906    1912    Great Britain.
187,712    12/1905    Germany.
577,603    6/1958    Italy.
697,799    9/1940    Germany.
106,663    2/1943    Sweden.
356,840    6/1905    France.
993,852    11/1951    France.

A HARRY LEVY, *Primary Examiner.*

EUGENE G. BOTZ, ARTHUR L. LA POINT, *Examiners.*